United States Patent
Castillo

(10) Patent No.: US 9,541,258 B2
(45) Date of Patent: Jan. 10, 2017

(54) LENS FOR WIDE LATERAL-ANGLE DISTRIBUTION

(71) Applicant: Cree, Inc., Durham, NC (US)

(72) Inventor: Mario Alberto Castillo, New Braunfels, TX (US)

(73) Assignee: Cree, Inc., Durham, NC (US)

( * ) Notice: Subject to any disclaimer, the term of this patent is extended or adjusted under 35 U.S.C. 154(b) by 569 days.

(21) Appl. No.: 13/842,776

(22) Filed: Mar. 15, 2013

(65) Prior Publication Data

US 2013/0223072 A1 Aug. 29, 2013

Related U.S. Application Data

(63) Continuation-in-part of application No. 13/466,076, filed on May 7, 2012, which is a continuation-in-part of application No. 13/408,882, filed on Feb. 29, 2012.

(51) Int. Cl.
*F21V 13/04* (2006.01)
*F21V 5/04* (2006.01)
(Continued)

(52) U.S. Cl.
CPC .............. *F21V 13/04* (2013.01); *F21V 5/007* (2013.01); *F21V 5/04* (2013.01); *G02B 19/0061* (2013.01);
(Continued)

(58) Field of Classification Search
CPC ............ F21V 5/08; F21V 13/04; F21V 5/007; F21V 5/04; F21S 8/088; F21S 8/086; F21Y 101/02; F21W 2101/00
(Continued)

(56) References Cited

U.S. PATENT DOCUMENTS 1,404,004 A 1/1922 Benford
1,535,486 A 4/1925 Lundy
(Continued)

FOREIGN PATENT DOCUMENTS

EP 1107210 A2 6/2001
GB 2282700 A 12/1995
(Continued)

OTHER PUBLICATIONS

Future Lighting Solutions "The 6 Steps to LED Lighting Success" brochure. Date: undated. 6 pages.

*Primary Examiner* — Sharon Payne
(74) *Attorney, Agent, or Firm* — Jansson Munger McKinley & Kirby Ltd.

(57) ABSTRACT

A lens for wide lateral-angle distribution of light from an LED light source on a board and defining an axis. The lens includes a board-adjacent base spaced from and around the axis, an inner light-receiving surface, an intermediate surface and an outer output surface configured for refracting light received from the inner and intermediate surfaces. The base forms an opening into a light-receiving cavity defined by the inner surface which includes (a) substantially planar front and back surface portions each extending from the opening and (b) an end surface portion spanning the cavity between the front and back surfaces and comprising front and back segments extending inwardly from the front and back surface portions, respectively, and each angled with respect to the other. The intermediate surface is positioned and configured for reflecting light received from the inner surface toward the outer output surface.

30 Claims, 16 Drawing Sheets

(51) Int. Cl.
   *G02B 19/00*    (2006.01)
   *F21V 5/00*     (2015.01)
   *F21W 131/103*  (2006.01)
   *F21Y 101/00*   (2016.01)

(52) U.S. Cl.
   CPC ..... *F21W 2131/103* (2013.01); *F21Y 2101/00* (2013.01); *G02B 19/0066* (2013.01)

(58) Field of Classification Search
   USPC .............................................. 362/309, 153.1
   See application file for complete search history.

(56) References Cited

U.S. PATENT DOCUMENTS

| | | |
|---|---|---|
| 2,007,033 A | 7/1935 | Williams |
| 2,212,876 A | 8/1940 | Chauvet |
| 2,254,961 A | 9/1941 | Harris |
| 2,356,654 A | 8/1944 | Cullman |
| 2,802,097 A | 8/1957 | Franck |
| 2,908,197 A | 10/1959 | Wells et al. |
| 3,497,687 A | 2/1970 | Hermann |
| 3,625,615 A | 12/1971 | Wilson |
| 4,186,995 A | 2/1980 | Schumacher |
| 4,254,453 A | 3/1981 | Mouyard et al. |
| 4,336,580 A | 6/1982 | Mouyard et al. |
| 4,345,308 A | 8/1982 | Mouyard et al. |
| 4,650,998 A | 3/1987 | Martin |
| 4,767,172 A | 8/1988 | Nichols et al. |
| 4,845,600 A | 7/1989 | Matsumura et al. |
| 4,862,330 A | 8/1989 | Machida et al. |
| 4,935,665 A | 6/1990 | Murata |
| 4,941,072 A | 7/1990 | Yasumoto et al. |
| 5,001,609 A | 3/1991 | Gardner et al. |
| 5,013,144 A | 5/1991 | Silverglate et al. |
| 5,014,165 A | 5/1991 | Naganawa |
| 5,062,027 A | 10/1991 | Machida et al. |
| 5,127,728 A | 7/1992 | Warren et al. |
| 5,140,220 A | 8/1992 | Hasegawa |
| 5,174,649 A | 12/1992 | Alston |
| RE34,254 E | 5/1993 | Dragoon |
| 5,289,082 A | 2/1994 | Komoto |
| 5,302,778 A | 4/1994 | Maurinus |
| 5,349,504 A | 9/1994 | Simms et al. |
| 5,592,578 A | 1/1997 | Ruh |
| 5,784,209 A | 7/1998 | Manabe |
| 5,813,743 A | 9/1998 | Naka |
| 5,813,752 A | 9/1998 | Singer et al. |
| 5,865,529 A | 2/1999 | Yan |
| 5,894,195 A | 4/1999 | McDermott |
| 5,894,196 A | 4/1999 | McDermott |
| 5,898,267 A | 4/1999 | McDermott |
| 5,924,788 A | 7/1999 | Parkyn, Jr. |
| 5,939,996 A | 8/1999 | Kniveton et al. |
| 5,995,291 A | 11/1999 | Togino |
| 6,097,549 A | 8/2000 | Jenkins et al. |
| 6,229,160 B1 | 5/2001 | Krames et al. |
| 6,244,727 B1 | 6/2001 | Ryan, Jr. et al. |
| 6,250,787 B1 | 6/2001 | Matubara |
| 6,273,596 B1 | 8/2001 | Parkyn, Jr. |
| 6,274,924 B1 | 8/2001 | Carey et al. |
| 6,283,613 B1 | 9/2001 | Schaffer |
| 6,296,376 B1 | 10/2001 | Kondo et al. |
| 6,323,063 B2 | 11/2001 | Krames et al. |
| 6,361,190 B1 | 3/2002 | McDermott |
| 6,361,192 B1 | 3/2002 | Fussell et al. |
| 6,443,594 B1 | 9/2002 | Marshall et al. |
| 6,473,238 B1 | 10/2002 | Daniell |
| 6,481,130 B1 | 11/2002 | Wu |
| 6,498,355 B1 | 12/2002 | Harrah et al. |
| 6,502,956 B1 | 1/2003 | Wu |
| 6,504,301 B1 | 1/2003 | Lowery |
| 6,536,923 B1 | 3/2003 | Merz |
| 6,541,800 B2 | 4/2003 | Barnett et al. |
| 6,547,423 B2 | 4/2003 | Marshall et al. |
| 6,550,940 B2 | 4/2003 | Kamiya et al. |
| 6,554,451 B1 | 4/2003 | Keuper |
| 6,560,038 B1 | 5/2003 | Parkyn, Jr. et al. |
| 6,570,190 B2 | 5/2003 | Krames et al. |
| 6,598,998 B2 | 7/2003 | West et al. |
| 6,601,962 B1 | 8/2003 | Ehara et al. |
| 6,607,286 B2 | 8/2003 | West et al. |
| 6,616,299 B2 | 9/2003 | Martineau |
| 6,637,921 B2 | 10/2003 | Coushaine |
| 6,679,621 B2 | 1/2004 | West et al. |
| 6,682,211 B2 | 1/2004 | English et al. |
| 6,721,101 B2 | 4/2004 | Daniell |
| 6,730,940 B1 | 5/2004 | Steranka et al. |
| 6,808,293 B2 | 10/2004 | Watanabe et al. |
| 6,837,605 B2 | 1/2005 | Reill |
| 6,846,101 B2 | 1/2005 | Coushaine |
| 6,851,835 B2 | 2/2005 | Smith et al. |
| 6,896,381 B2 | 5/2005 | Benitez et al. |
| 6,903,376 B2 | 6/2005 | Shen et al. |
| 6,918,677 B2 | 7/2005 | Shipman |
| 6,924,943 B2 | 8/2005 | Minano et al. |
| 6,929,384 B2 | 8/2005 | Watanabe et al. |
| 6,948,840 B2 | 9/2005 | Grenda et al. |
| 6,955,451 B2 | 10/2005 | Coushaine et al. |
| 6,987,613 B2 | 1/2006 | Pocius et al. |
| 6,991,355 B1 | 1/2006 | Coushaine et al. |
| 6,995,402 B2 | 2/2006 | Ludowise et al. |
| 7,009,213 B2 | 3/2006 | Camras et al. |
| 7,021,797 B2 | 4/2006 | Minano et al. |
| 7,042,021 B2 | 5/2006 | Isoda |
| 7,053,419 B1 | 5/2006 | Camras et al. |
| 7,063,441 B2 | 6/2006 | Kramer et al. |
| 7,063,450 B2 | 6/2006 | Ehara et al. |
| 7,064,355 B2 | 6/2006 | Camras et al. |
| 7,080,932 B2 | 7/2006 | Keuper |
| 7,083,313 B2 | 8/2006 | Smith |
| 7,104,672 B2 | 9/2006 | Zhang |
| 7,106,523 B2 | 9/2006 | McLean et al. |
| 7,111,972 B2 | 9/2006 | Coushaine et al. |
| 7,114,838 B2 | 10/2006 | Wu |
| 7,118,236 B2 | 10/2006 | Hahm et al. |
| 7,118,262 B2 | 10/2006 | Negley |
| 7,121,691 B2 | 10/2006 | Coushaine et al. |
| 7,125,143 B2 | 10/2006 | Hacker |
| 7,125,160 B2 | 10/2006 | Wong et al. |
| 7,150,553 B2 | 12/2006 | English et al. |
| 7,153,000 B2 | 12/2006 | Park et al. |
| 7,153,002 B2 | 12/2006 | Kim et al. |
| 7,172,324 B2 | 2/2007 | Wu et al. |
| 7,181,378 B2 | 2/2007 | Benitez et al. |
| 7,182,497 B2 | 2/2007 | Lee et al. |
| 7,213,945 B2 | 5/2007 | Yoneda et al. |
| 7,246,923 B2 | 7/2007 | Conner |
| 7,246,931 B2 | 7/2007 | Hsieh et al. |
| 7,254,309 B1 | 8/2007 | Chou et al. |
| 7,280,288 B2 | 10/2007 | Loh et al. |
| 7,329,029 B2 | 2/2008 | Chaves et al. |
| 7,348,723 B2 | 3/2008 | Yamaguchi et al. |
| 7,352,011 B2 | 4/2008 | Smits et al. |
| 7,410,275 B2 | 8/2008 | Sommers et al. |
| 7,411,742 B1 | 8/2008 | Kim et al. |
| 7,549,769 B2 | 6/2009 | Kim et al. |
| 7,674,018 B2 | 3/2010 | Holder et al. |
| 7,722,227 B2 | 5/2010 | Zhang et al. |
| 7,766,509 B1 | 8/2010 | Laporte |
| 7,837,374 B2 | 11/2010 | Hsu et al. |
| 7,841,750 B2 | 11/2010 | Wilcox et al. |
| 7,854,536 B2 | 12/2010 | Holder et al. |
| 7,866,837 B2 | 1/2011 | Ho |
| 7,901,098 B2 | 3/2011 | Saitoh et al. |
| 7,922,369 B2 | 4/2011 | Condon et al. |
| 7,938,559 B2 | 5/2011 | Angelini et al. |
| 7,942,558 B2 | 5/2011 | Zweig et al. |
| 8,002,435 B2 | 8/2011 | Laporte |
| 8,058,665 B2 | 11/2011 | Wang et al. |
| 8,132,944 B2 | 3/2012 | Ruud et al. |
| 8,231,248 B2 | 7/2012 | Fu et al. |
| 8,348,475 B2 | 1/2013 | Wilcox et al. |
| 8,388,193 B2 | 3/2013 | Wilcox et al. |

(56) References Cited

U.S. PATENT DOCUMENTS

| | | |
|---|---|---|
| 8,573,815 B2 | 11/2013 | Mallory et al. |
| 2004/0037076 A1 | 2/2004 | Katoh et al. |
| 2004/0114355 A1 | 6/2004 | Rizkin et al. |
| 2004/0156209 A1 | 8/2004 | Ishida |
| 2004/0207999 A1 | 10/2004 | Suehiro et al. |
| 2004/0212291 A1 | 10/2004 | Keuper |
| 2005/0073849 A1 | 4/2005 | Rhoads et al. |
| 2005/0083699 A1 | 4/2005 | Rhoads et al. |
| 2005/0179041 A1 | 8/2005 | Harbers et al. |
| 2005/0205878 A1 | 9/2005 | Kan |
| 2005/0224826 A1 | 10/2005 | Keuper et al. |
| 2005/0281047 A1 | 12/2005 | Coushaine et al. |
| 2006/0013000 A1 | 1/2006 | Coushaine et al. |
| 2006/0013002 A1 | 1/2006 | Coushaine et al. |
| 2006/0039143 A1 | 2/2006 | Katoh et al. |
| 2006/0044806 A1 | 3/2006 | Abramov et al. |
| 2006/0067640 A1 | 3/2006 | Hsieh et al. |
| 2006/0082999 A1 | 4/2006 | Klein |
| 2006/0083000 A1 | 4/2006 | Yoon et al. |
| 2006/0105482 A1 | 5/2006 | Alferink et al. |
| 2006/0181902 A1 | 8/2006 | Tamura et al. |
| 2006/0186431 A1 | 8/2006 | Miki et al. |
| 2006/0198144 A1 | 9/2006 | Miyairi et al. |
| 2007/0019416 A1 | 1/2007 | Han et al. |
| 2007/0058369 A1 | 3/2007 | Parkyn et al. |
| 2007/0097693 A1 | 5/2007 | Klose |
| 2007/0133209 A1 | 6/2007 | Wang et al. |
| 2007/0177389 A1 | 8/2007 | Pickard et al. |
| 2007/0201225 A1 | 8/2007 | Holder et al. |
| 2007/0258248 A1 | 11/2007 | Duhe |
| 2007/0263393 A1 | 11/2007 | Van De Ven |
| 2007/0274667 A1 | 11/2007 | Loh et al. |
| 2008/0084693 A1 | 4/2008 | Shimada et al. |
| 2008/0084701 A1 | 4/2008 | Van De Ven et al. |
| 2008/0101063 A1 | 5/2008 | Koike et al. |
| 2008/0106907 A1 | 5/2008 | Trott et al. |
| 2008/0130298 A1 | 6/2008 | Negley et al. |
| 2008/0205061 A1 | 8/2008 | Holder et al. |
| 2008/0239722 A1 | 10/2008 | Wilcox |
| 2009/0067172 A1 | 3/2009 | Inoue et al. |
| 2009/0086498 A1 | 4/2009 | Condon et al. |
| 2009/0097262 A1 | 4/2009 | Zhang et al. |
| 2009/0290360 A1 | 11/2009 | Wilcox et al. |
| 2009/0298376 A1 | 12/2009 | Guillien et al. |
| 2010/0014286 A1 | 1/2010 | Yoneda et al. |
| 2010/0027271 A1 | 2/2010 | Wilcox et al. |
| 2010/0039810 A1 | 2/2010 | Holder et al. |
| 2010/0073927 A1 | 3/2010 | Lewin et al. |
| 2010/0085763 A1 | 4/2010 | Aguglia |
| 2010/0085764 A1 | 4/2010 | Chuang |
| 2010/0110695 A1 | 5/2010 | Nakamura |
| 2010/0128488 A1 | 5/2010 | Marcoux |
| 2010/0135028 A1 | 6/2010 | Kokubo |
| 2010/0271708 A1 | 10/2010 | Wilcox |
| 2010/0271829 A1 | 10/2010 | Laporte |
| 2010/0295071 A1 | 11/2010 | Tsai et al. |
| 2010/0302786 A1 * | 12/2010 | Wilcox et al. ............. 362/327 |
| 2011/0019425 A1 | 1/2011 | Chen et al. |
| 2011/0026247 A1 | 2/2011 | Zhang |
| 2011/0103070 A1 | 5/2011 | Zhang et al. |
| 2011/0110098 A1 | 5/2011 | Fu |
| 2011/0115360 A1 | 5/2011 | Holder et al. |
| 2011/0164425 A1 | 7/2011 | Chen |
| 2011/0186897 A1 | 8/2011 | Loh |
| 2012/0051047 A1 | 3/2012 | Lu et al. |

FOREIGN PATENT DOCUMENTS

| | | |
|---|---|---|
| JP | 60199746 A | 10/1985 |
| JP | 61160328 A | 7/1986 |
| JP | 61185980 A | 8/1986 |
| JP | 61214000 A | 9/1986 |
| JP | 61214485 A | 9/1986 |
| JP | 8264839 | 10/1996 |
| WO | 8600146 A1 | 1/1986 |
| WO | 9950596 A2 | 10/1999 |
| WO | 0024062 A1 | 4/2000 |
| WO | 2006109113 A2 | 10/2006 |
| WO | 2006111805 A1 | 10/2006 |
| WO | 2007018927 A2 | 2/2007 |
| WO | 2008144672 A1 | 11/2008 |

* cited by examiner

LENS FOR WIDE LATERAL-ANGLE DISTRIBUTION

RELATED APPLICATION

This application is a continuation-in-part of currently-pending patent application Ser. No. 13/466,076, filed May 7, 2012, which is a continuation-in-part of currently-pending patent application Ser. No. 13/408,882, filed Feb. 29, 2012. The entire contents of both parent applications are incorporated herein by reference.

FIELD OF THE INVENTION

The invention relates generally to the field of lighting systems and, more particularly, to apparatus for utilizing LED light sources for illuminating areas with a predefined pattern of light intensity.

BACKGROUND OF THE INVENTION

There is a need for lighting apparatus which is low-cost and energy efficient. LEDs (light-emitting diodes) provide light sources which are energy efficient, and advances in LED technology are providing even greater efficiencies over time. Some typical applications for lighting systems are roadway and parking lot lighting in which there are performance requirements such as the requirement that light be most efficiently and uniformly distributed over wide areas which are to be lighted. In applications such as for illuminating information boards or advertisement billboards, signs, including transportation signs and the like, as well as building facade lighting, there is a need to direct light at the widest angle possible in order to draw particular attention to the wide area to be illuminated while utilizing a minimum number of light fixtures.

Some efforts have been made to develop LED lenses for directing LED light into a desired light distribution. Some of such lenses are difficult and expensive to manufacture, which increases overall cost for LED lighting using such lenses. Yet such lenses fall short in providing light distribution required for proper illumination of wide target surfaces.

It would be highly beneficial to provide an improved lighting apparatus which produces a desired light distribution for illumination of wide target surfaces. It would be further beneficial that such lighting apparatus have high efficiency with useful output of maximum emitted light at wide angles and in the desired direction with improved uniformity of distribution of such light across the illuminated area.

SUMMARY OF THE INVENTION

One aspect of this invention is an improved lens for distribution of light from an LED light source on a board and defining an axis.

In certain embodiments, the lens includes an inner surface, an intermediate surface and an outer output surface which is configured for refracting light received from the inner and intermediate surfaces.

The inner surface defines a light-receiving cavity. In some embodiments, the inner surface includes substantially planar front and back surface portions and an end surface portion spanning the cavity between the front and back surface portions. Each of the front and back surface portions extends from the opening to terminate at the end surface portion.

The inner surface may also include a pair of substantially planar lateral surface portions each extending from the opening between the front and back surface portions. In some embodiments, the inner front, back and lateral surface portions are substantially parallel to the axis.

In certain embodiments, the inner front and back surface portions are substantially orthogonal to the inner lateral surface portion. In some of such embodiments, the cavity opening is substantially rectangular. The term "substantially rectangular," as used herein with respect to the cavity opening, means (1) that the cavity opening has four sides and (2) that at least about one-third of the cross-dimension of each side of the cavity opening is straight or that at least about one-third of the cross-dimension of the longer sides (if there is a pair of longer sides) is substantially straight. (It should be recognized that the "square" is a subset of "rectangular.") It should be noted that while rounded corners of the cavity opening and of the surrounding inner wall do not impact the distribution of light in a significant way, such rounding provides advantages during manufacturing of the inventive lens. In particular, the minimizing of sharpness at corners facilitates accurate molding of the inventive lens.

In certain embodiments, the end surface portion includes front and back segments each extending inwardly from the respective front and back surface portions. Each of the segments may be angled with respect to the other. In some embodiments, the back segment extends from the back surface portion in a direction toward the board, and in some the front segment extends from the front surface portion in a direction toward the board.

Each of the front and back segments of the end surface portion may extend inwardly from the opposite inner lateral surface portions to positions progressively farther from the board. The back segment may extend to positions farther from the board than the front segment.

In certain embodiments, each of the front and back segments includes a substantially concave middle portion and a pair of opposite substantially convex lateral portions adjoining the substantially convex middle portion. The end surface portion may extend from the inner lateral surface portions. In some of these embodiments, the back segment extends from the back surface portion in a direction toward the board, and in some the front segment extends from the front surface portion in a direction toward the board.

The intermediate surface is positioned and configured for reflecting light received from the front and back inner surface portions toward the outer output surface. In some embodiments, the intermediate surface includes front and back reflective surface portions positioned and configured to reflect light received from the front and back inner surface portions, respectively. The front and back reflective surface portions extend away from the axis radially outwardly of the front and back inner surface portions, respectively. The front reflecting surface portion may have a front curvature configuration which differs from a back curvature configuration of the back reflecting surface portion. It should be understood that the term "curvature" refers to a three-dimensional curved surface. The front and back reflecting surface portions may each be bilaterally symmetric.

In some embodiments, the back reflecting surface portion terminates at a greater distance from the board than the front reflecting surface portion, and in some the back reflecting surface portion terminates at a greater distance from the axis than the front reflecting surface portion.

The intermediate surface may further include a pair of intermediate lateral surface portions each adjoining the front and back reflective surface portions such that the intermediate surface extends continuously around the inner surface. In some of such embodiments, the front and back reflective surface portions are disposed at distances from the board which are greatest along the front and back, respectively, and gradually decrease toward the lateral surface portions. The intermediate lateral surface portions may be substantially free of receiving light from the inner surface.

The intermediate lateral surface portions may have substantially-identical lateral curvatures which differ from the configurations of the front and back curvatures. Another aspect of the rounded corners of the cavity opening and a base edge of the intermediate surface is that such rounding provides smooth transition from the lateral curvatures to the front and back curvatures of the intermediate surface.

In certain embodiments, the outer output surface includes a main output surface portion transverse the axis. In some of such embodiments, the main-output surface portion defines a pair of substantially convex lateral sectors with a front-to-back concavity therebetween for refracting lateral light received from the inner surface laterally away from the axis to facilitate wide lateral-angle distribution. The main output surface portion may be configured for refracting forward and rearward light received from the inner front and back surface portions away from the axis to facilitate uniform distribution of light. To further facilitate uniform distribution of light, the main output surface may be configured for refracting light received from the front and back reflecting surface portions toward the axis.

In some embodiments, the outer output surface includes an outer lateral surface portion which extends from the main output surface portion toward the board. The outer lateral surface portion may be configured for refracting light received from the inner surface toward the axis to facilitate uniformity of the illumination pattern. The outer lateral surface portion may be substantially parallel to the axis.

In certain embodiments, the outer lateral surface portion is defined by an outer surrounding wall which extends from the main output surface portion and the intermediate surface toward the board. In some of such embodiments, the outer lateral surface portion has a substantially right cylindrical shape of substantially circular cross-sections taken in planes parallel to the board.

Some versions of the inventive lens may include an outward flange extending from the outer surrounding wall away from the axis.

In certain embodiments, the inventive lens is bilaterally symmetric in a front-to-back direction.

Another aspect of this invention involves a lighting apparatus which includes a plurality of LED light sources spaced along a circuit board, each of the LED light sources defining an axis. The lighting apparatus includes a plurality of lenses according to the present invention, each lens over a corresponding one of the LED light sources.

In some embodiments, the lighting apparatus includes a one-piece lensing member which includes a plurality of lens portions interconnected by a flange portion. In such embodiments, each of the lens portions includes one of the plurality of the lenses.

When the inventive lens is installed for illumination of a surface such as a billboard of a transportation sign, the configuration of the inner end surface portion in combination with the configuration of the main output surface facilitates directing light for an extended lateral distance along the longer dimension of the illuminated surface. In such applications, the combination of the reflecting surface portions and the configuration of the main output surface narrows the front-to-back light spread to provide desirable maximum illumination along substantially the entirety of the shorter dimension of the illuminated surface. This creates a long and narrow illumination pattern that meets the needs for sign or billboard illumination, but may also be used for illuminating facades of buildings and other surfaces.

The light source may include at least one light-emitting diode (LED). Such light source may be an LED emitter which may include a single LED (or a closely-spaced group of LEDs) mounted either directly on the board (e.g., a circuit board) or in the form of an LED package with the LED(s) on a submount on the board. The LED emitter may include what is commonly referred to as a primary lens over the LED(s). In some embodiments, the inventive lens is a so-called secondary lens placed over the primary lens. In some other embodiments, the lens according to the present invention is the primary lens directly over the LED(s).

The term "transverse," as used herein in reference to the main output surface with respect to the emitter axis, means that this surface intersects the emitter axis.

As used herein in referring to portions of the devices of this invention, the terms "upward," "upwardly," "upper," "downward," "downwardly," "lower," "upper," "top," "bottom" and other like terms assume that the light fixture is in its usual position of use and do not limit the invention to any particular orientation.

In descriptions of this invention, including in the claims below, the terms "comprising," "including" and "having" (each in their various forms) and the term "with" are each to be understood as being open-ended, rather than limiting, terms.

DETAILED DESCRIPTION OF EXEMPLARY EMBODIMENTS

Figure 18:
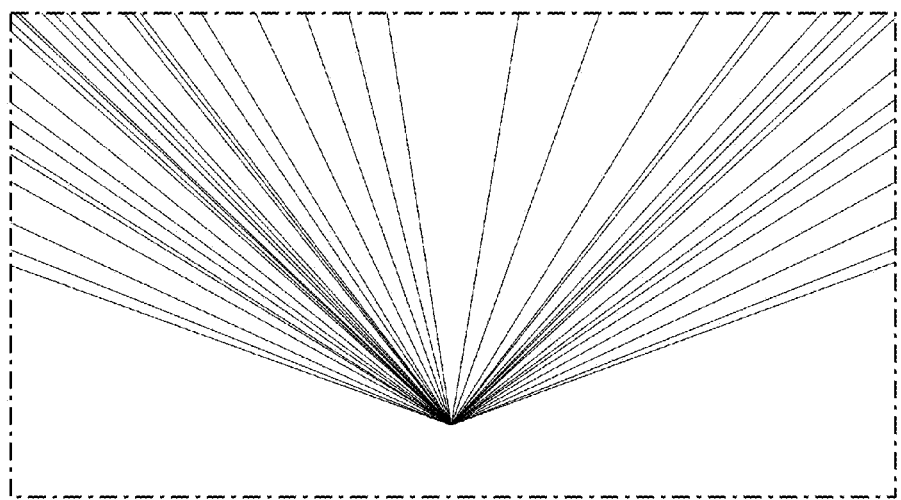
FIG. 18 is a ray-trace schematically illustrating far-field lateral light distribution of the lens as shown in FIG. 17.
Figure 19:
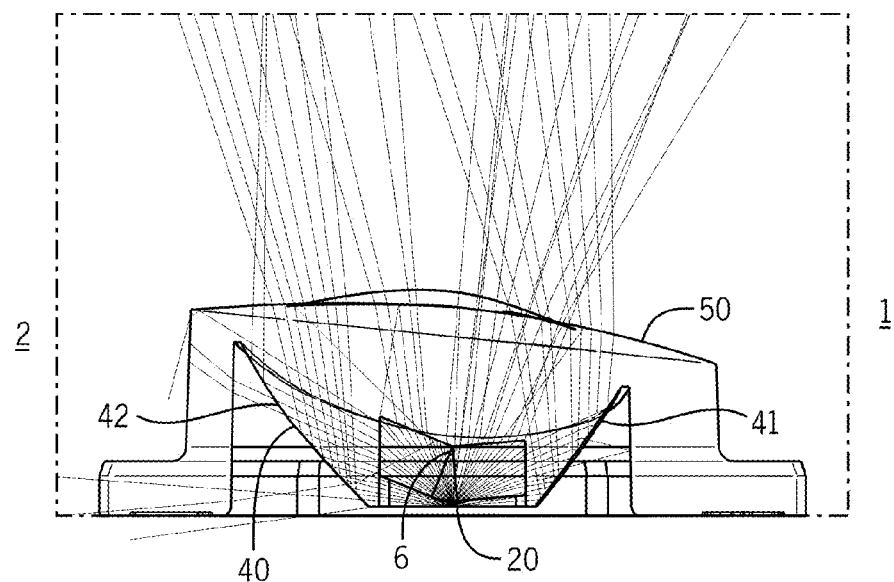
FIG. 19 is another front-to-back sectional view schematically illustrating aspects of the near-field forward and rearward light distribution of the lens.

FIGS. 1-26 show aspects of an exemplary embodiment of a lens 10 in accordance with this invention. Lens 10 is configured for directing light from a light source 20 on a board and defining an axis 6. The light source may be an LED emitter which includes a single LED (or a closely-spaced group of LEDs) mounted either directly on the board or in the form of an LED package with the LED(s) on a submount on the board. A primary lens may be disposed over the LED(s). In such embodiments, lens 10 is a secondary lens placed over the primary lens as seen in FIGS. 17 and 19.

Figure 16:
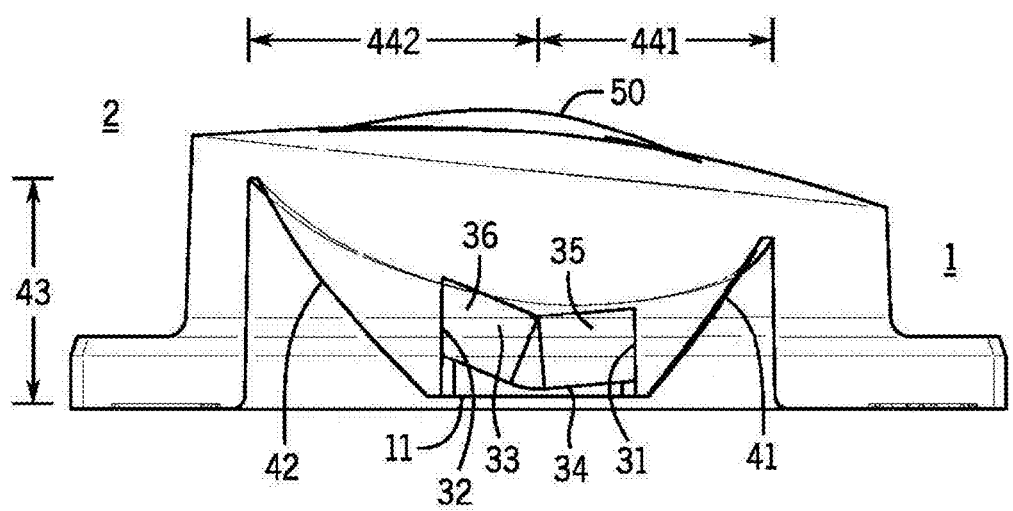
FIG. 16 is a front-to-back sectional view of the lens of FIG. 1 taken along section 16-16 shown in FIG. 4.
Figure 17:
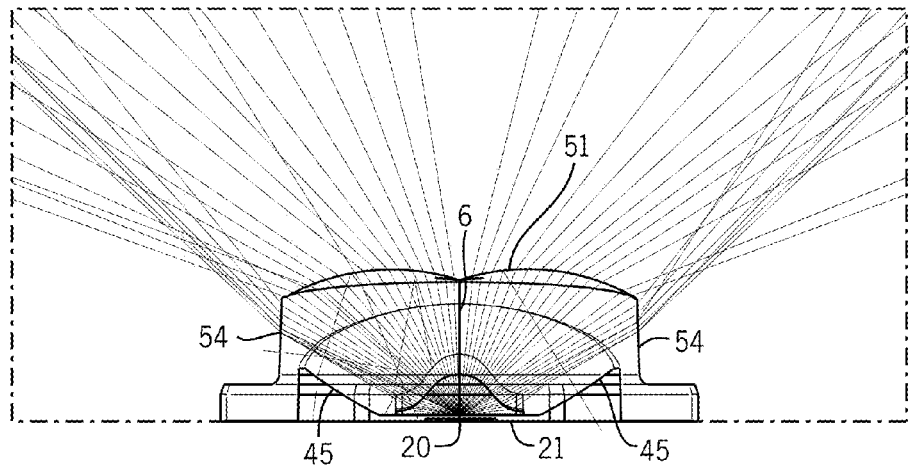
FIG. 17 is another side-to-side sectional view schematically illustrating lateral aspects of the near-field light distribution of the lens.

FIGS. 1-7, 15 and 17 illustrate lens 10 which includes a board-adjacent base 11 spaced from and around axis 6, an inner surface 30, an intermediate surface 40 and an outer output surface 50. As seen in FIGS. 17 and 19, outer output surface 50 is configured for refracting light received from inner surface 30 and intermediate surface 40. As best seen in FIGS. 2, 9, 15 and 16, base 11 forms an opening 12 into a light-receiving cavity 13 defined by inner surface 30.

FIGS. 3-7 show lens 10 being bilaterally symmetric in a front-to-back direction.

Figure 1:
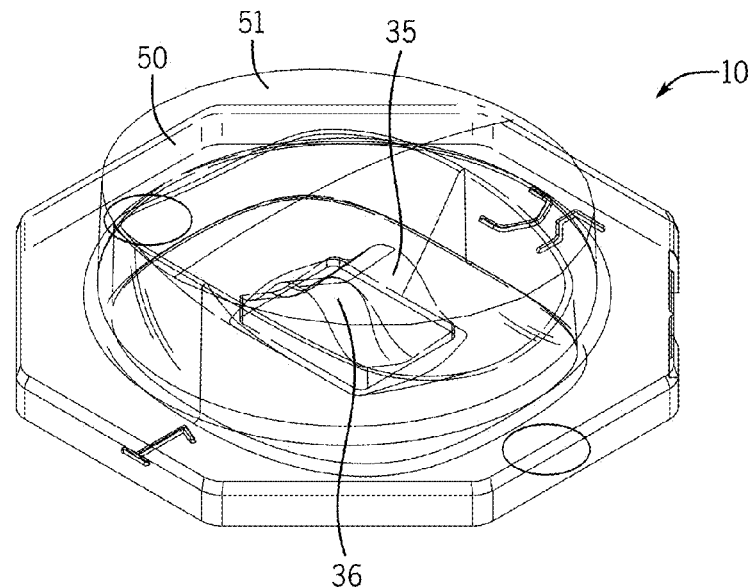
FIG. 1 is a transparent perspective view of one embodiment of the lens of the present invention showing the lens from the light-output side.
Figure 2:
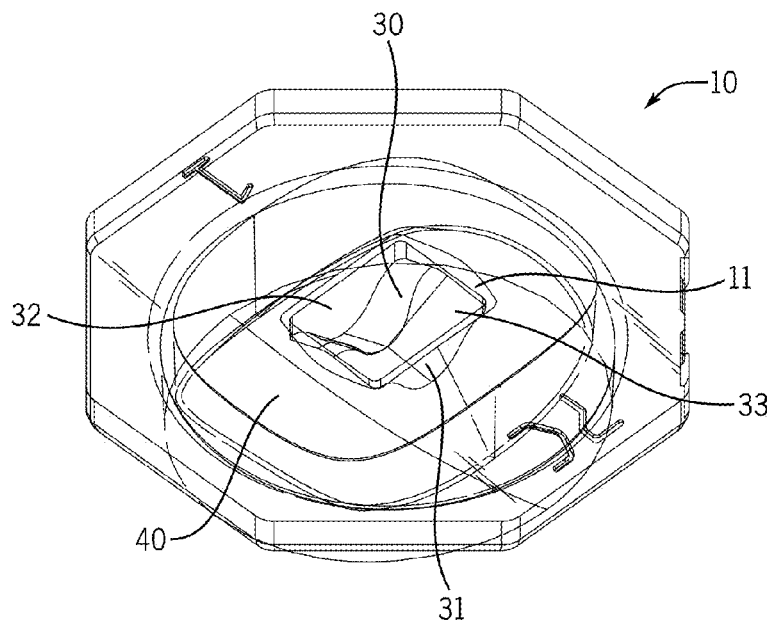
FIG. 2 is a transparent perspective view showing the lens of FIG. 1 from the board side.
Figure 23:
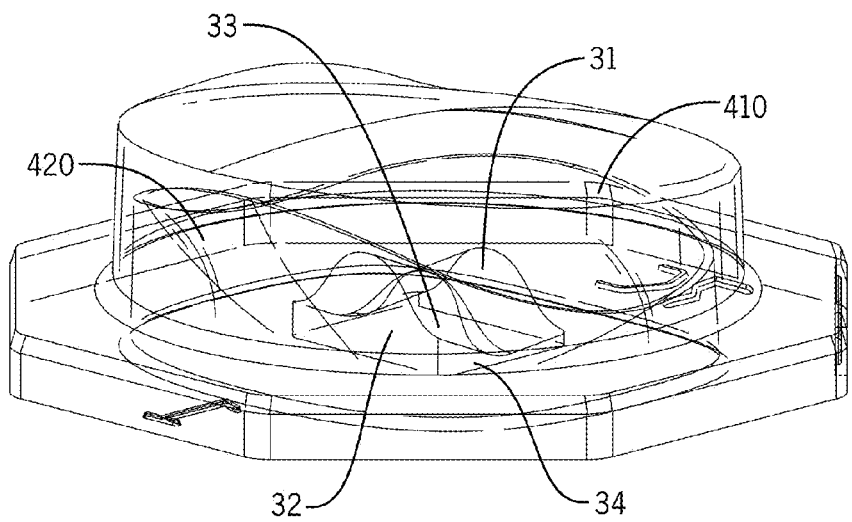
FIG. 23 is another transparent perspective view of the embodiment of the lens of FIG. 1 showing the lens from the back side.
Figure 24:
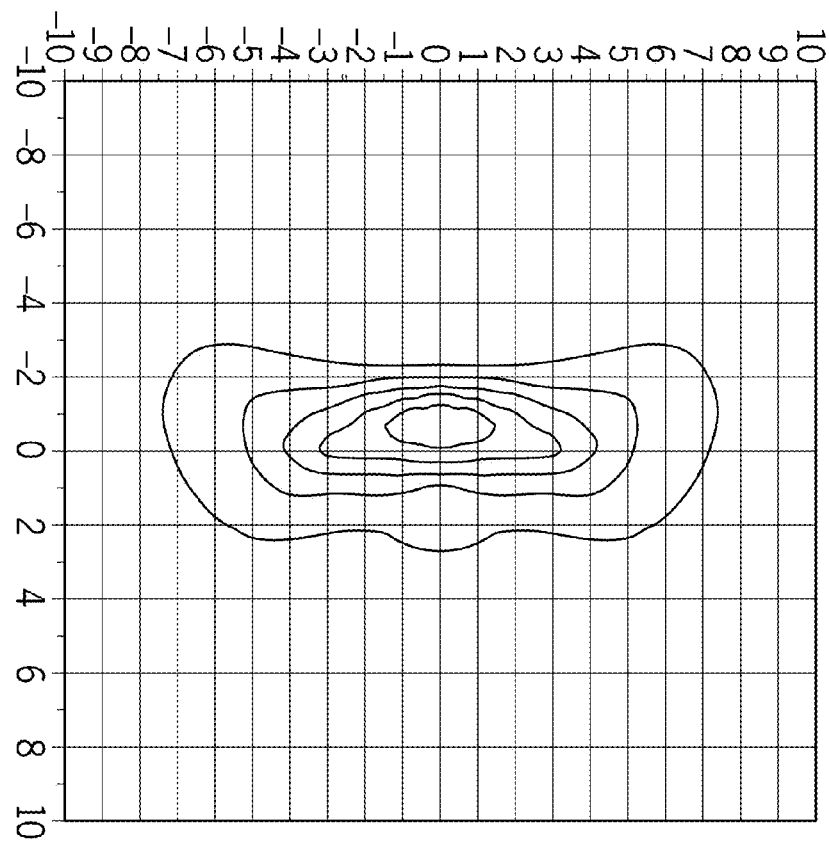
FIG. 24 is a two-dimensional top view ISO plot of luminance intensity by a lens according to the present invention on an illuminated surface.

It is best seen in FIGS. 1, 2, 9, 16 and 23 that inner surface 30 includes substantially planar front and back surface portions 31 and 32 and an end surface portion 33 spanning cavity 13 between front and back surface portions 31 and 32. FIGS. 2 and 23 best illustrate each of front and back surface portions 31 and 32 extending from opening 12 to terminate at end surface portion 33.

As seen in FIGS. 1, 2, 5-7 and 23, inner surface 30 also includes a pair of substantially planar lateral surface portions 34 each extending from opening 12 between front and back surface portions 31 and 32. FIGS. 5-7, 15-17 and 19 best show, each of front and back surface portions 31 and 32 being substantially parallel to axis 6. FIGS. 1-4 and 23 show that inner front and back surface portions 31 and 32 are substantially orthogonal to inner lateral surface portion 34.

Figure 4:
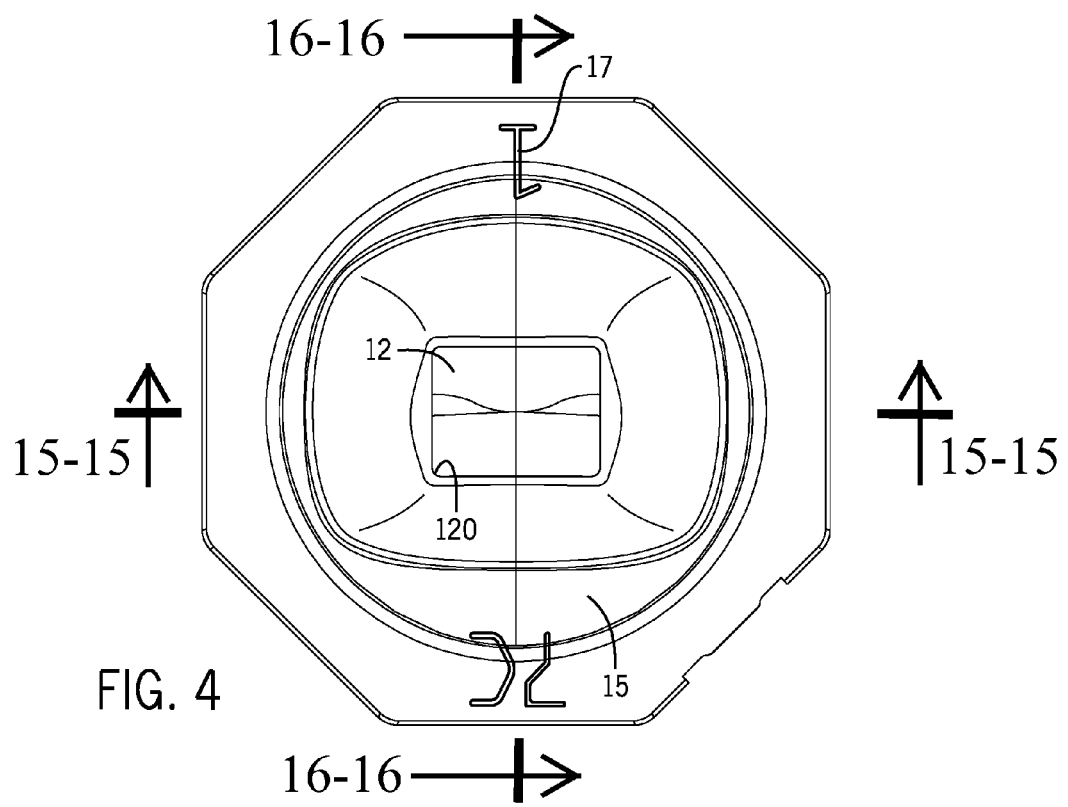
FIG. 4 is a transparent board-side plan view of the embodiment of the lens of FIG. 1.
Figure 5:
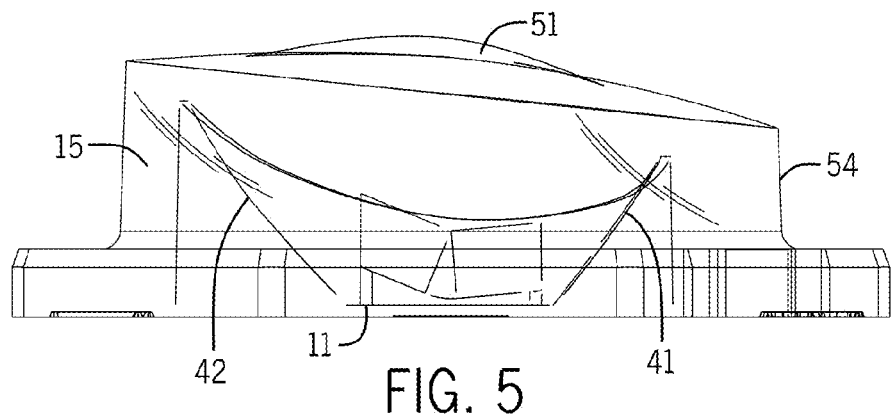
FIG. 5 is a transparent lateral elevation of the embodiment of the lens of FIG. 1.
Figure 6:
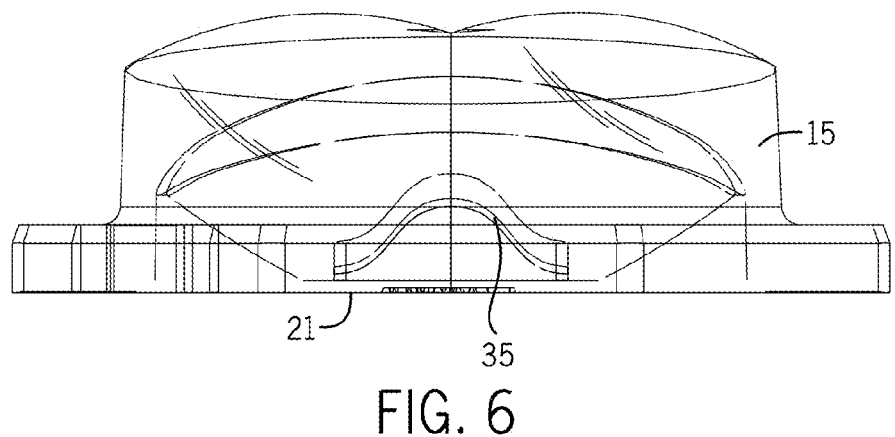
FIG. 6 is a transparent front elevation of the embodiment of the lens of FIG. 1.
Figure 7:
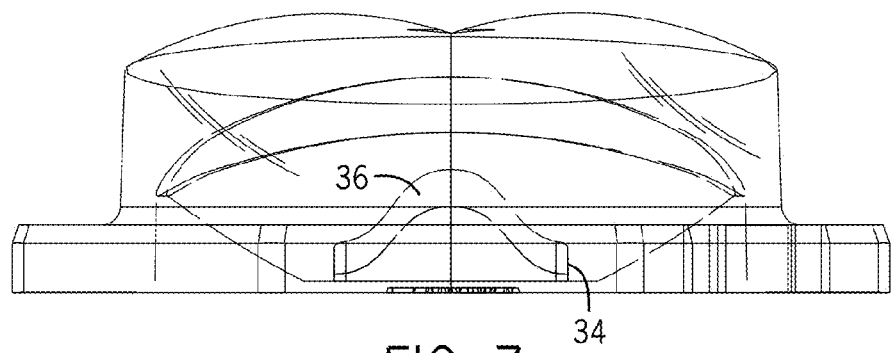
FIG. 7 is a transparent back elevation of the embodiment of the lens of FIG. 1.
Figure 8:
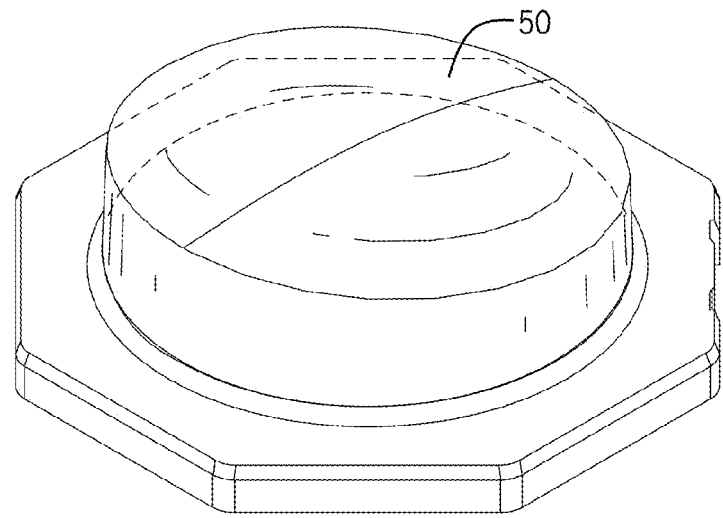
FIG. 8 is an opaque perspective view showing the lens of FIG. 1 from the light-output side.
Figure 11:
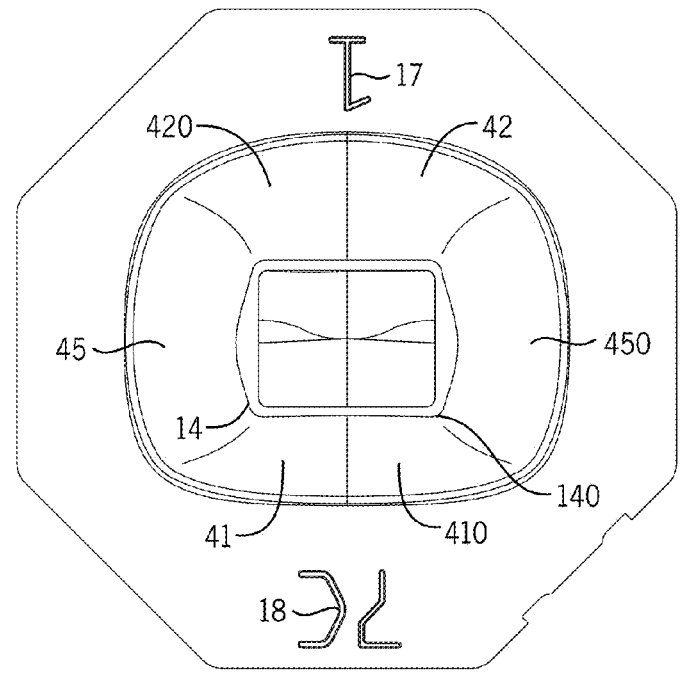
FIG. 11 is an opaque board-side plan view of the lens of FIG. 8.
Figure 12:
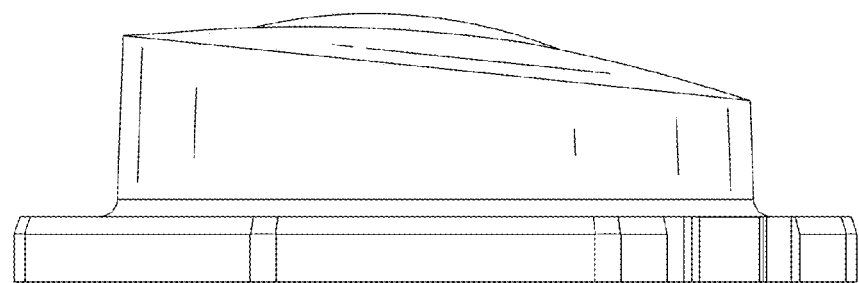
FIG. 12 is an opaque lateral elevation of the lens of FIG. 8.
Figure 13:
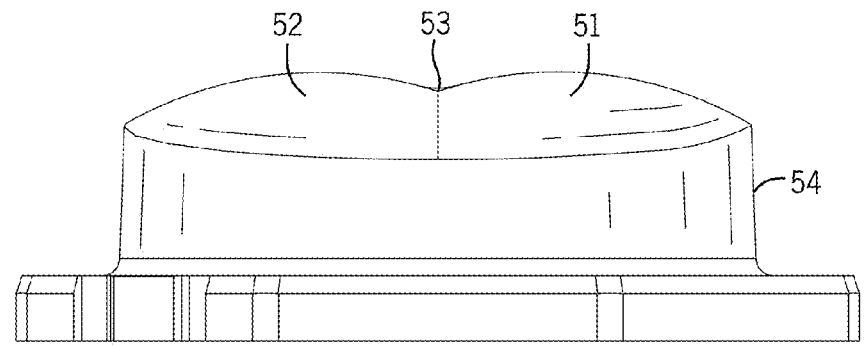
FIG. 13 is an opaque front elevation of the lens of FIG. 8.
Figure 14:
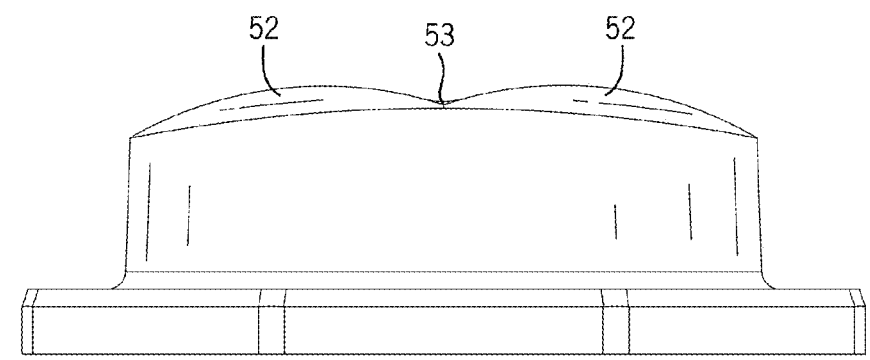
FIG. 14 is an opaque back elevation of the lens of FIG. 8.

FIGS. 4 and 11 illustrate cavity opening 12 substantially rectangular with inner front, back and lateral surface portions 31, 32 and 34, respectively, each extending from one of four sides of opening 12. Rounded corners 120 of opening 12 and 130 of cavity 13 provide advantages during manufacturing of lens 10 by facilitating accurate molding of the lens surfaces.

As best seen in FIGS. 1, 2, 16 and 23, end surface portion 33 includes front and back segments 35 and 36 each extending inwardly from front and back surface portions 31 and 32, respectively. Back segment 36 extends from back surface portion 32 in a direction toward base 11, and front segment 35 extends from front surface portion 31 in a direction toward base 11.

FIGS. 1, 6, 7 and 23 show each of front and back segments 35 and 36 of end surface portion 33 extending inwardly from the opposite inner lateral surface portions 34 to positions progressively farther from base 11. Back segment 36 extends to positions farther from base 11 than front segment 35, as best seen in FIG. 16. Each of segments 35 and 36 are angled with respect to the other, as seen in FIGS. 16 and 23. Such angled configuration provides initial spreading of high concentration of light emitted within about 30° angle around axis 6 by spreading the light away from the hot spot location immediately about axis 6 and removing so-called hot spots along axis 6 by refracting the light away from the hot spot location immediately about axis 6, as seen in FIG. 19.

As best seen in FIGS. 1, 2, 6, 7 and 15, front segment 35 includes a substantially concave middle portion 351 and a pair of opposite substantially convex lateral portions 352 and adjoining substantially concave middle portion 351. Back segment 36 also includes a substantially concave middle portion 361 and a pair of opposite substantially convex lateral portions 362 and adjoining substantially concave middle portion 361. The concave shape of middle portions 351 and 361 end surface portion 33 provides lateral spread of light emitted within about a 50° angle around emitter axis 6, thereby providing broad light distribution (schematically shown in FIG. 17) beneficial for wide-lateral angle illumination patterns. The convex shape of lateral portions 352 and 362 provides initial direction of light emitted along angles close to board 21 toward useful angles between board 21 and axis 6.

Figure 9:
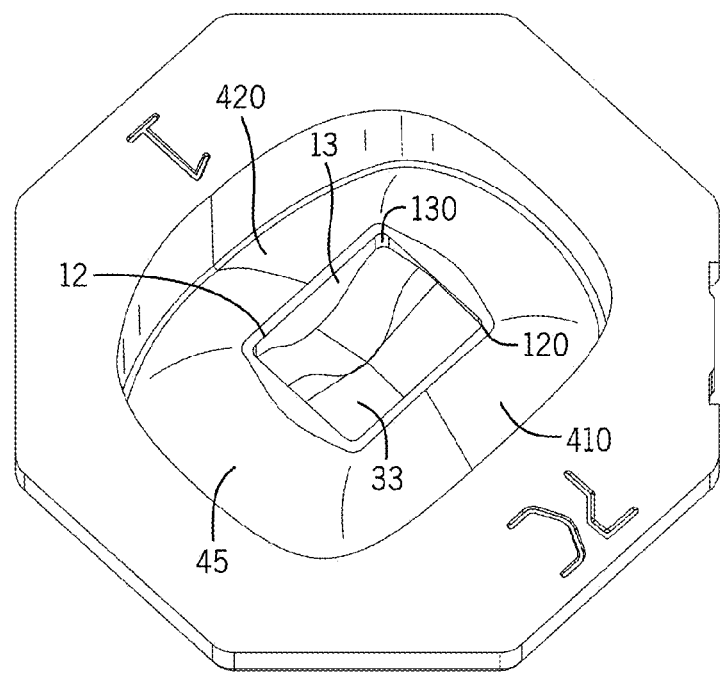
FIG. 9 is an opaque perspective view showing the lens of FIG. 8 from the board side.

FIG. 19 also shows that intermediate surface 40 is positioned and configured for total internal reflection (TIR) of light received from front and back inner surface portions 32 and 33 toward outer output surface 50. It is best seen in FIGS. 16, 19 and 23 that intermediate surface 40 includes front and back reflective surface portions 41 and 42. FIG. 19 shows that front and back reflective surface portions 41 and 42 are positioned and configured to receive light from front and back inner surface portions 31 and 32, respectively, and reflect such light through TIR toward outer output surface 50. As best seen in FIGS. 2, 9 and 23, front and back reflective surface portions 41 and 42 extend from base 11 away from axis 6 radially outwardly of front and back inner surface portions 31 and 32, respectively. It is further seen in FIGS. 5, 16 and 23 that front reflecting surface portion 41 has a front curvature configuration 410 which differs from a back curvature configuration 420 of back reflecting surface portion 42. FIGS. 4, 6, 7 and 11 show that front and back reflecting surface portions 41 and 42 are bilaterally symmetric.

As illustrated in FIGS. 5, 6, 16, 19 and 23, back reflecting surface portion 42 terminates at a greater distance 43 from base 11 than front reflecting surface portion 41. It is best seen in FIG. 16 that back reflecting surface portion 42 also terminates at a greater distance 442 from axis 6 than distance 441 at which front reflecting surface portion 41 terminates from axis 6.

FIGS. 2, 9, 11 and 15 show intermediate surface 40 further includes a pair of intermediate lateral surface portions 45 each adjoining front and back reflective surface portions 41 and 42 such that intermediate surface 40 extends continuously around inner surface 30. Front and back reflective surface portions 41 and 42 are at distances from base 11 which are greatest along front and back 1 and 2, respectively, and gradually decrease toward lateral surface portions 45. FIG. 17 shows intermediate lateral surface portions 45 positioned and configured to be substantially free of receiving light from inner surface 30.

Figure 15:
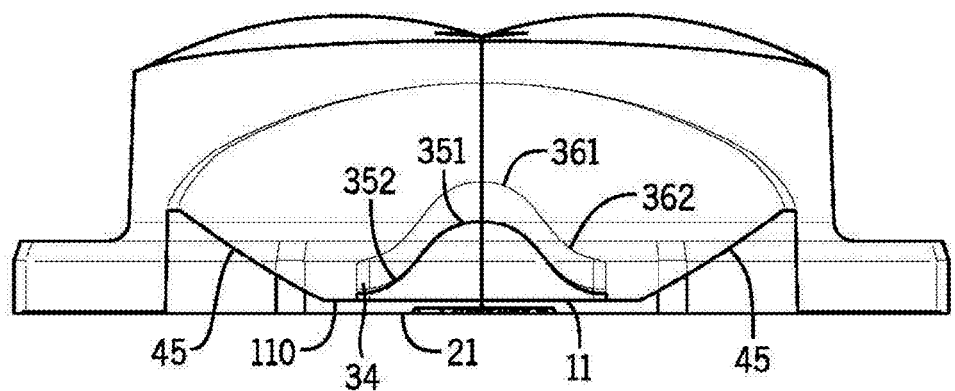
FIG. 15 is a side-to-side sectional view of the lens of FIG. 1 taken along section 15-15 shown in FIG. 3.

As best seen in FIGS. 11 and 15, intermediate lateral surface portions 45 have substantially identical lateral curvatures 450 which differ from configurations of front and back curvatures 410 and 420. FIGS. 2, 4, 9 and 11 also show that rounded corners 140 of a base edge 14 of intermediate surface 40 provide smooth transition from lateral curvatures 450 to front and back curvatures 410 and 420 of intermediate surface 40.

Figure 21:
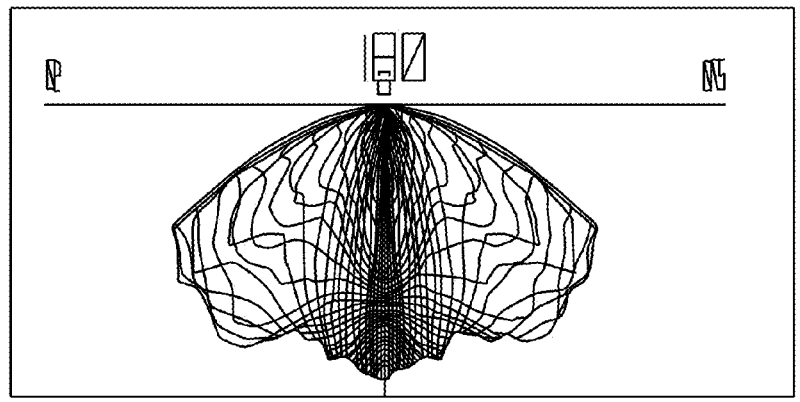
FIG. 21 is a front view of a three-dimensional polar intensity distribution by a lens according to the present invention.

FIGS. 1, 5-8, 13-17, 19 and 23 show outer output surface 50 including a main output surface portion 51 transverse axis 6. It is best shown in FIGS. 6, 7, 13-15, 19 and 23 that main-output surface portion 51 defines a pair of substantially convex lateral sectors 52 with a front-to-back concavity 53 therebetween for refracting lateral light received from inner surface 30 further laterally away from axis 6, as seen in FIG. 17, to facilitate wide lateral-angle light distribution as illustrated in FIGS. 18 and 21.

Figure 20:
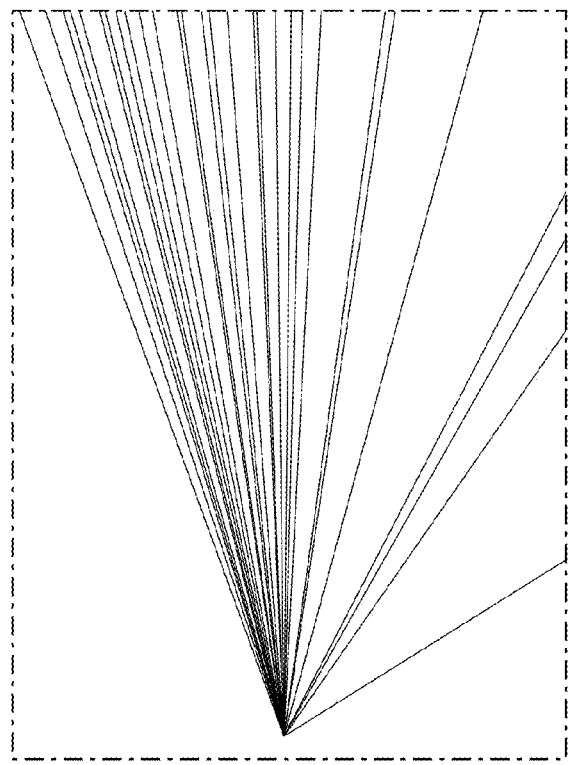
FIG. 20 is a ray-trace schematically illustrating far-field forward and rearward light distribution of the lens as shown in FIG. 19.
Figure 22:
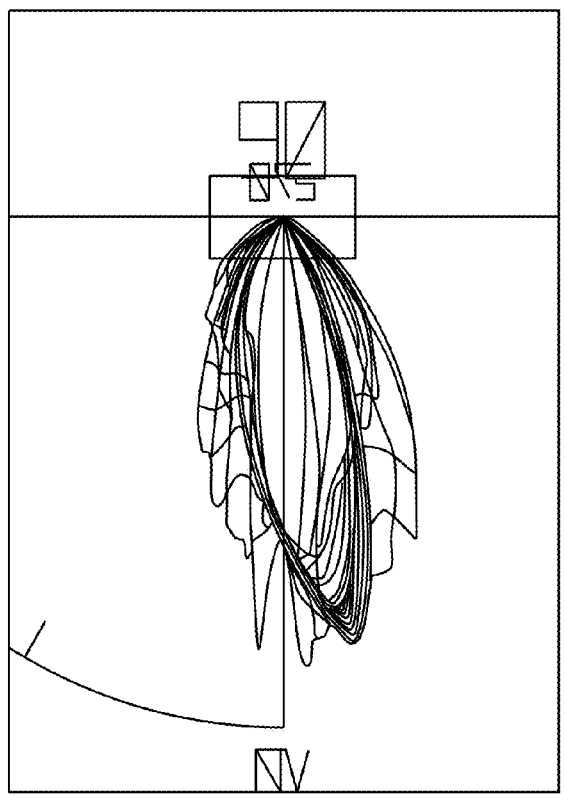
FIG. 22 is a side view of a three-dimensional polar intensity distribution by a lens according to the present invention.

FIG. 19 shows main output surface portion 51 configured for refracting forward and rearward light received from inner front and back surface portions 31 and 32 further away from axis 6 to facilitate uniform distribution of light, as seen in FIGS. 20 and 22.

As also seen in FIG. 19, to further facilitate uniform distribution of light, main output surface 51 is also configured for refracting light received from front and back reflecting surface portions 41 and 42 toward axis 6.

It is also seen in FIGS. 1, 5-8, 15-17, 19 and 23 that outer output surface 50 includes an outer lateral surface portion 54 which extends from main output surface portion 51 toward base 11. FIG. 17 illustrates outer lateral surface portion 54 configured for refracting light received from inner surface 30 toward axis 6 to facilitate uniformity of the illumination pattern seen in FIGS. 25 and 26. As seen in FIGS. 5-7 and 15-17, outer lateral surface portion 54 is substantially parallel to axis 6.

Figure 3:
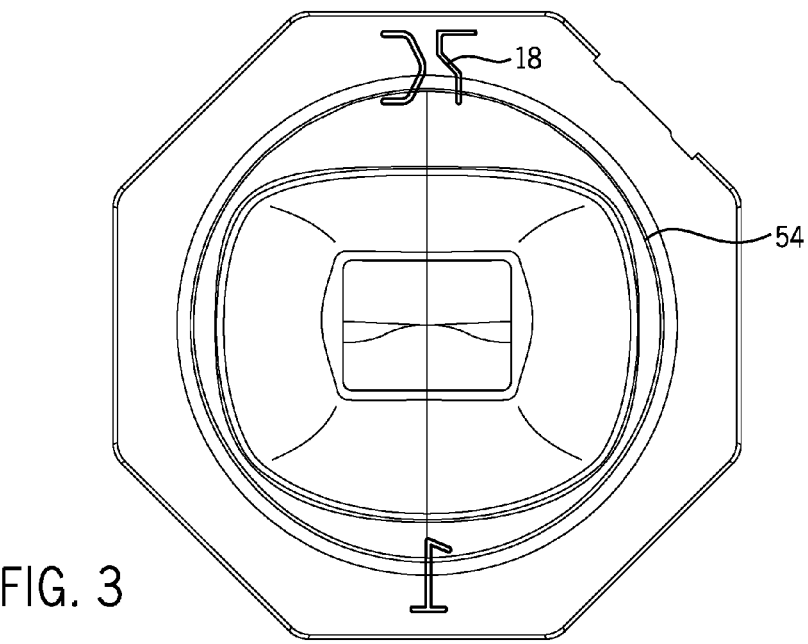
FIG. 3 is a transparent output-side plan view of the embodiment of the lens of FIG. 1.
Figure 10:
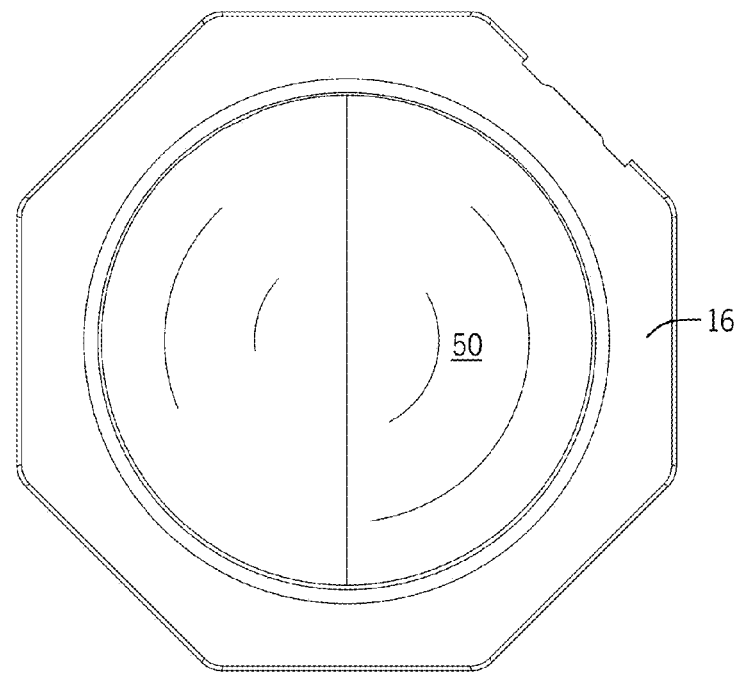
FIG. 10 is an opaque output-side plan view of the lens of FIG. 8.

FIGS. 5, 15-17 and 19 show that outer lateral surface portion 54 is defined by an outer surrounding wall 15 which extends from main output surface portion 51 and intermediate surface 40 toward board 21. As seen in FIGS. 3 and 10, outer lateral surface portion 54 has a substantially right cylindrical shape of substantially circular cross-sections taken in planes parallel to base 11. It should be understood that many other configurations for the outer surrounding wall are possible, including, without limitation surfaces generated by movement of a line which is other than straight. In some examples, the outer lateral surface may have various annular shapes, including shapes having different cross-sectional configurations at different positions therealong or shapes angled with respect to the emitter axis.

FIGS. 1-17 also show lens 10 including an outward flange 16 extending from outer surrounding wall 15 away from axis 16. Outward flange 16 is shown as having an octagonal perimeter which facilitates mounting of the lens during light-fixture assembly. Flange 16, best shown in FIGS. 3, 4, 10 and 11, also has a lens-type-identifying marking 18 and a locator label 17 which references the lens location in an LED-array module. An orientation between marking 18 and label 17 indicates front 1 and back 2 of the light distribution shown in FIG. 22. These markings are preferably readable by robotic equipment for correct lens placement and orientation during light-fixture assembly. FIGS. 15 and 16 show flange 15 extending beyond a plane 110 of base 11 with respect to emitter axis 6 in a direction opposite the light emission. FIGS. 17 and 19 show that such spacing allows positioning of plane 110 at the same level with the LED(s) of light source 20 for most efficient capturing of emitted light by inner surface 30.

Another aspect of this invention involves a lighting apparatus which includes a plurality of LED light sources spaced along a circuit board, each of the LED light sources defining an axis. The lighting apparatus includes a plurality of the inventive lenses according to the present invention, each lens over a corresponding one of the LED light sources.

In some embodiments, the lighting apparatus includes a one-piece lensing member which includes a plurality of lens portions interconnected by a flange portion. In such embodiments, each of the lens portions includes one of the plurality of the lenses.

It should be noted that inventive lens 10 has the configuration which is described above and which allows for molding of lens 10 in a single-piece mold. In other words, the lens configuration preferably permits easy removal of the lens from the mold without the need for separating the mold pieces as is the case with some lenses that require multiple-piece molds. The inventive lens can be simply pulled out of the mold.

Figure 33:
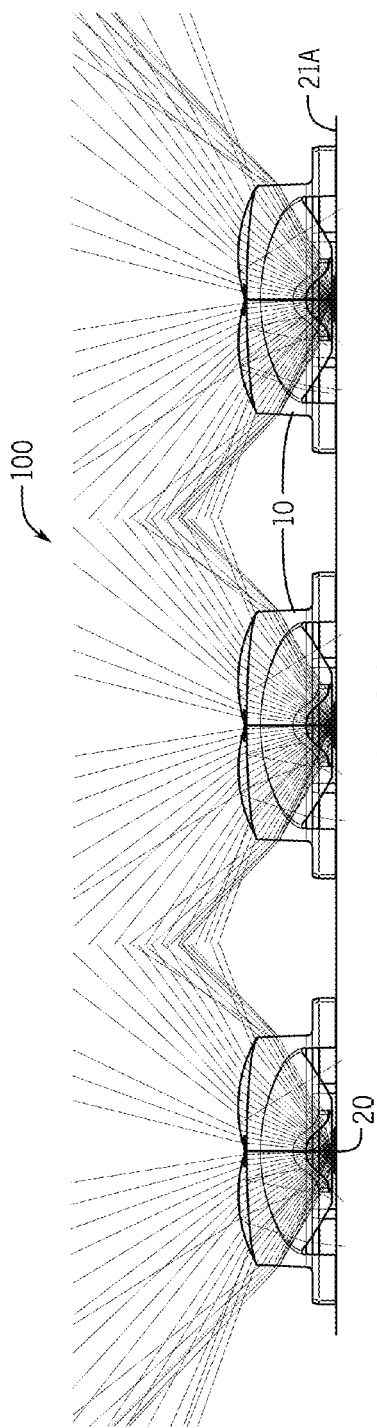
FIG. 33 is a side-to-side sectional view of one embodiment of a lighting apparatus including a plurality of lenses over a plurality of light sources and schematically illustrating lateral aspects of the near-field light distribution of such lighting apparatus.
Figure 34:
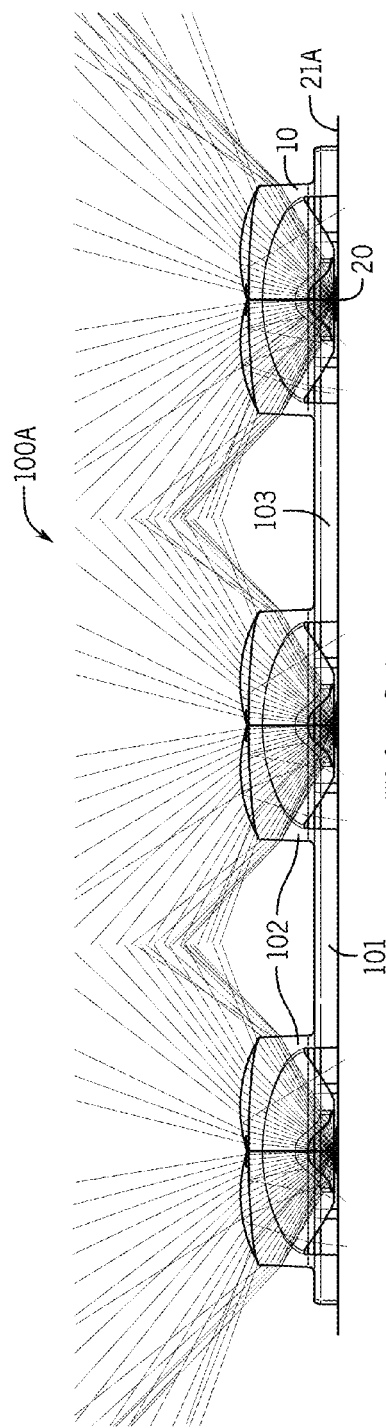
FIG. 34 is a side-to-side sectional view of another embodiment of the lighting apparatus including a one-piece lensing member incorporating a plurality of the lenses each according to the present invention.

FIGS. 33 and 34 show another aspect of this invention which involves a lighting apparatus 100 including a plurality of LED light sources 20 spaced along a circuit board 21A.

Lighting apparatus 100 includes a plurality of inventive lenses 10 each over a corresponding one of LED light sources 20.

FIG. 34 shows lighting apparatus 100A which includes a one-piece lensing member 101 which includes a plurality of lens portions 102 interconnected by a flange portion 103. Each of lens portions 102 includes one of the plurality of lenses 10.

Figure 25:
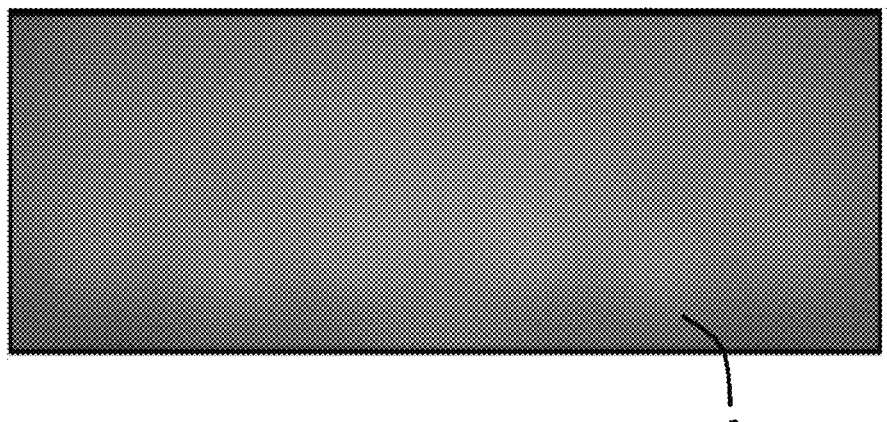
FIG. 25 is a photographic luminance rendering of a 14'×48' billboard.
Figure 26:
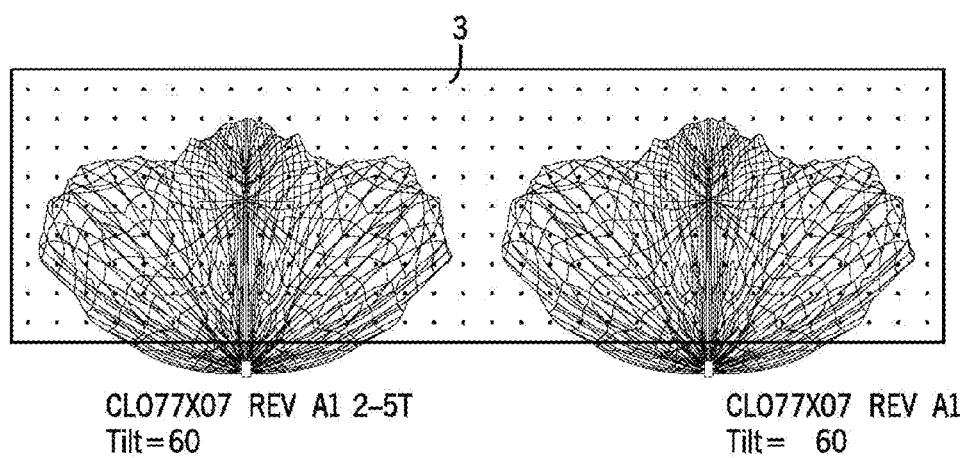
FIG. 26 is a schematic illuminance view of a 14'×48' billboard.

FIGS. 25 and 26 schematically illustrate lens 10 being used in light fixtures installed for illumination of a surface 3 such as a billboard of a transportation sign. These figures show that light is directed for an extended lateral distance along the longer dimension of illuminated surface 3 such that a minimal number of light fixtures need to be installed. FIG. 26 shows only two light fixtures illuminating the entire surface 3.

In fixtures utilizing a plurality of emitters, a plurality of LEDs or LED arrays may be disposed directly on a common submount in spaced relationship between the LEDs or LED arrays. This type of LED emitters is sometimes referred to as chip-on-board LEDs. In some other embodiments, each of the LED emitters is on a submount and each of the submounts is mounted on the circuit board. In some of such embodiments, each of the LEDs or LED arrays may be overmolded with a respective primary lens. Lens 10 according to the present invention may form the primary lens over a respective one of the LEDs or LED arrays. In some other embodiments, a plurality of inventive lenses 10 form secondary lenses each over a respective one primary lenses. In some of such embodiments, the plurality of lenses 10 may be molded as a single piece which may have a single flange surrounding each of the plurality of lenses 10, as seen in FIG. 34.

FIGS. 27-32 show light source 20 including at least one light-emitting diode (LED) 22. Light source 20 may be a light emitter in the form of an LED package 23 which has a primary lens 24 over the at least one LED 22. In such embodiments, lens 10 is a secondary lens placed over primary lens 24. Light emitter 20 may be of the type illustrated in FIGS. 29-31 which show LED package 23D with single LED 22 on a submount 26 and hemispheric primary lens 24D coaxially overmolded on submount 26 over LED 22.

Figure 27:
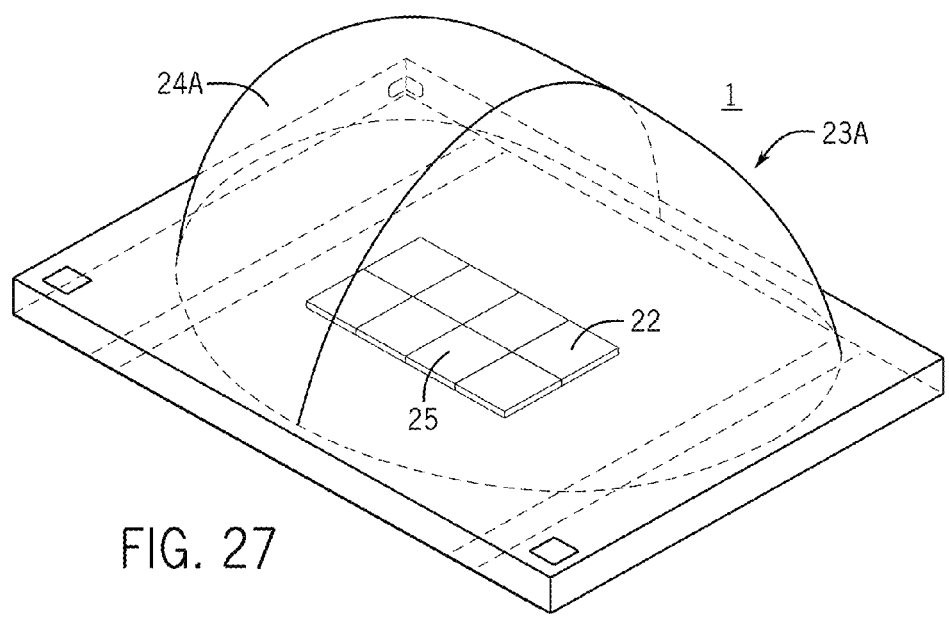
FIG. 27 is an enlarged perspective view of one example of an LED package and including an array of eight LEDs on a submount and an asymmetric primary lens overmolded over the LED array.
Figure 28:
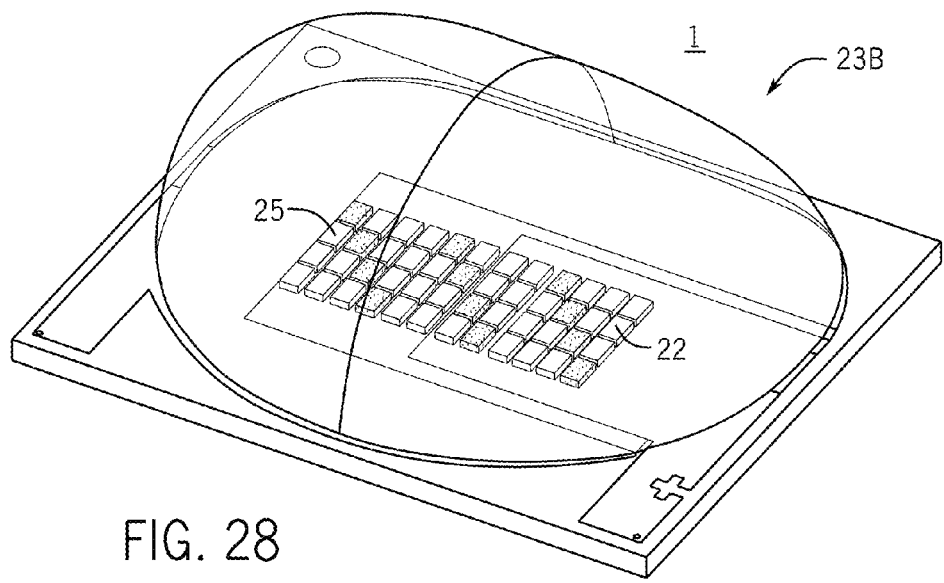
FIG. 28 is an enlarged perspective view of another example of an LED package and including an array of forty-eight LEDs on a submount and an asymmetric primary lens overmolded over the LED array.
Figure 29:
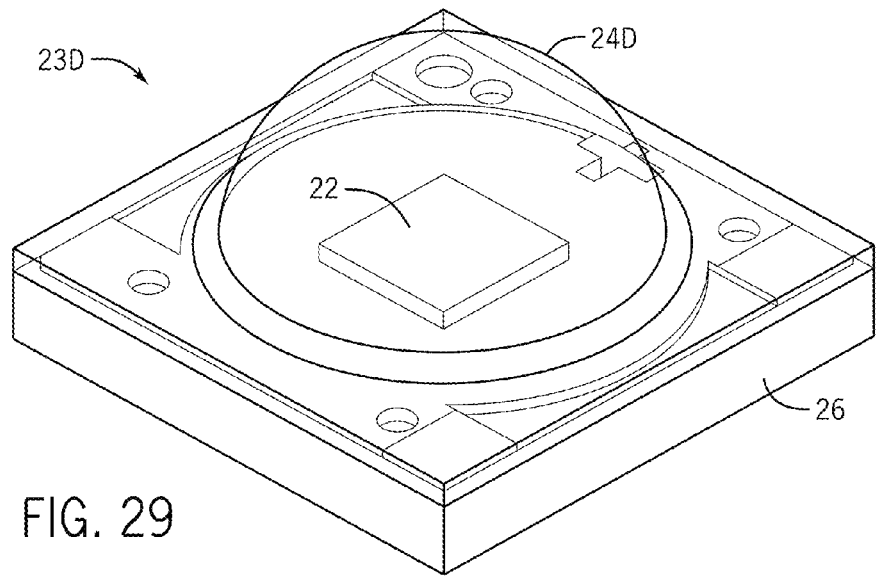
FIG. 29 is an enlarged perspective view of yet another example of an LED package which has a single LED on a submount with a hemispheric primary lens overmolded over the LED.
Figure 30:
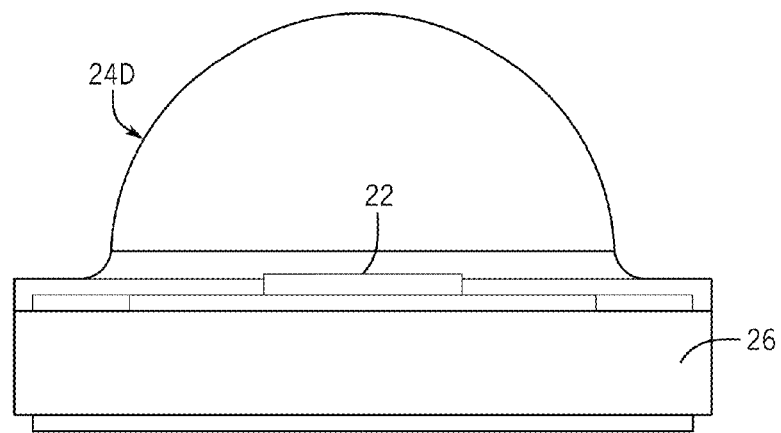
FIG. 30 is an enlarged side view of the LED package of FIG. 29.
Figure 31:
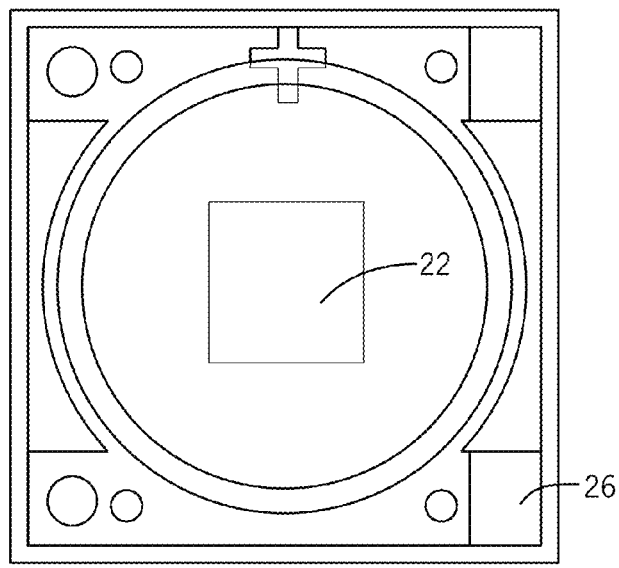
FIG. 31 is an enlarged top view of the LED package of FIG. 29.

FIGS. 27 and 28 illustrate exemplary LED packages 23A and 23B each including an array of LEDs 22 on an LED-populated area 25 which has an aspect ratio greater than 1, and primary lens 24 being overmolded on a submount 26 over LED-populated area 25. It is seen in FIG. 28 that the array may include LEDs 22 emitting different-wavelength light of different colors such as including red LEDs along with light green or other colors to achieve natural white light. Light emitters of the type as LED packages 23A and 23B are described in detail in application Ser. No. 13/441,558, filed on Apr. 6, 2012, and in application Ser. No. 13/441,620, filed on Apr. 6, 2012. The contents of both applications are incorporated herein by reference in their entirety.

Figure 32:
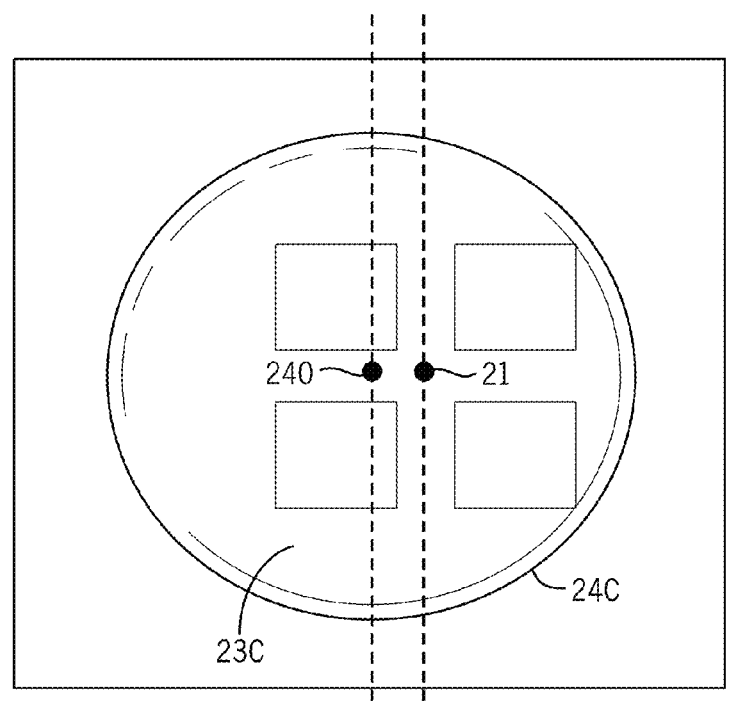
FIG. 32 is an enlarged top view of another exemplary LED package including an array of four LEDs on a submount and a hemispheric primary lens overmolded over the LED array such that the axis of the primary lens is offset from the axis of the LED array.

FIGS. 27, 28 and 32 illustrate versions of LED light emitter 20 configured to refract LED-emitted light in a forward direction 1 (i.e., toward front 1). In each LED package 23A, 23B and 23C, each LED array defines an emitter axis. FIGS. 27 and 28 illustrate primary lens 24A configured to refract LED-emitted light forward. FIG. 32 shows hemispheric primary lens 24C having a centerline 240 offset from the emitter axis. It should be understood that for higher efficiency, LED emitter 20 may have a primary lens which is both has its centerline offset from the emitter axis and is shaped for refraction of LED-emitted light toward preferential side 2. In FIGS. 27 and 28, primary lens 24A is shown as asymmetric.

While the principles of this invention have been described in connection with specific embodiments, it should be understood clearly that these descriptions are made only by way of example and are not intended to limit the scope of the invention.

The invention claimed is:

1. A lens for distribution of light from an LED light source on a board and defining an axis, the lens comprising:
   an inner surface defining a light-receiving cavity with an opening defining a base plane, the inner surface comprising (a) substantially planar front and back surface portions and (b) an end surface portion spanning the cavity between the front and back surfaces and comprising front and back segments each extending inwardly toward the base plane from the front and back surface portions, respectively, and each angled with respect to the other;
   an outer output surface configured for refracting light received from the inner surface; and
   an intermediate surface positioned and configured for reflecting light received from the inner surface toward the outer output surface.

2. The lens of claim 1 wherein the back segment extends from the back surface portion in a direction toward the board.

3. The lens of claim 2 wherein the front segment extends from the front surface portion in a direction toward the board.

4. The lens of claim 1 wherein the inner surface further comprises a pair of substantially planar lateral surface portions each extending from the opening between the front and back surface portions.

5. The lens of claim 4 wherein the inner front, back and lateral surface portions are substantially parallel to the axis.

6. The lens of claim 5 wherein the inner front and back surface portions are substantially orthogonal to the inner lateral surface portion.

7. The lens of claim 4 wherein each of the front and back segments of the end surface portion extends inwardly from the opposite inner lateral surface portions to positions progressively farther from the board.

8. The lens of claim 7 wherein the back segment extends to positions farther from the board than the front segment.

9. The lens of claim 7 wherein each of the front and back segments comprises a middle portion substantially concave in side-to-side sectional view and a pair of opposite lateral portions substantially convex in side-to-side sectional view, each of the lateral portions extending from one of the inner lateral surface portions and adjoining the substantially concave middle portion.

10. The lens of claim 1 wherein the back segment is substantially planar in front-to-back sectional view.

11. The lens of claim 10 wherein the front segment is substantially planar in front-to-back sectional view.

12. The lens of claim 9 wherein the intermediate surface comprises front and back reflective surface portions positioned and configured to reflect light received from the front and back inner surface portions, respectively.

13. The lens of claim 12 wherein the front and back reflective surface portions extend from the base plane away from the axis radially outwardly of the front and back inner surface portions, respectively.

14. The lens of claim 13 wherein the front reflecting surface portion has a front curvature configuration which differs from a back curvature configuration of the back reflecting surface portion.

15. The lens of claim 14 wherein the front and back reflecting surface portions are each bilaterally symmetric.

16. The lens of claim 14 wherein the back reflecting surface portion terminates at a greater distance from the board than the front reflecting surface portion.

17. The lens of claim 16 wherein the back reflecting surface portion terminates at a greater distance from the axis than the front reflecting surface portion.

18. The lens of claim 14 wherein the intermediate surface further comprises a pair of intermediate lateral surface portions each adjoining the front and back reflective surface portions such that the intermediate surface extends continuously around the inner surface, the intermediate lateral surface portions being substantially free of receiving light from the inner surface.

19. The lens of claim 18 wherein the intermediate lateral surface portions have substantially-identical lateral curvatures which differ from configurations of the front and back curvatures.

20. The lens of claim 1 wherein the outer output surface comprises a main output surface portion transverse the axis and defining a pair of substantially convex lateral sectors with a front-to-back concavity therebetween for refracting lateral light received from the inner surface laterally away from the axis to facilitate wide lateral-angle distribution.

21. The lens of claim 20 wherein the main output surface portion is configured for refracting forward and rearward light received from the inner front and back surface portions away from the axis to facilitate uniform distribution of light.

22. The lens of claim 21 wherein the main output surface is configured for refracting light received from the front and back reflecting surface portions toward the axis to further facilitate uniform distribution of light.

23. The lens of claim 20 wherein the outer output surface further comprises an outer lateral surface portion extending from the main output surface portion toward the board, the outer lateral surface portion being configured for refracting light received from the inner surface toward the axis to facilitate uniformity of the illumination pattern.

24. The lens of claim 23 wherein the outer lateral surface portion is substantially parallel to the axis.

25. The lens of claim 24 wherein the outer lateral surface portion is defined by an outer surrounding wall which extends from the main output surface portion and the intermediate surface toward the board.

26. The lens of claim 25 wherein the outer lateral surface portion has a substantially right cylindrical shape of substantially circular cross-sections taken in planes parallel to the board.

27. The lens of claim 25 further comprising an outward flange extending from the outer surrounding wall away from the axis.

28. The lens of claim 1 being bilaterally symmetric in a front-to-back direction.

29. The lens of claim 1 being a part of a lighting apparatus which comprises:
    a plurality of LED light sources spaced along a circuit board, each of the LED light sources defining an axis; and
    a plurality of the lenses each over a corresponding one of the LED light sources.

30. The lens of claim 29 wherein the lighting apparatus includes a one-piece lensing member comprising a plurality of lens portions interconnected by a common flange portion, each of the lens portions including one of the plurality of the lenses.

* * * * *